United States Patent [19]
Wetegrove et al.

[11] Patent Number: 4,687,807
[45] Date of Patent: Aug. 18, 1987

[54] USE OF AMIDASE FOR REDUCING THE ACRYLAMIDE CONTENT OF WATER-IN-OIL EMULSIONS CONTAINING ACRYLAMIDE POLYMERS

[75] Inventors: Robert L. Wetegrove, Winfield; Ralph W. Kaesler, Barrington, both of Ill.

[73] Assignee: Nalco Chemical Company, Naperville, Ill.

[21] Appl. No.: 14,327

[22] Filed: Feb. 13, 1987

[51] Int. Cl.$^4$ ............................................. C08J 9/04
[52] U.S. Cl. ............................. 524/827; 526/106; 528/492; 435/228; 435/262
[58] Field of Search ............... 524/827; 526/199; 528/492; 435/228, 262

[56] References Cited

U.S. PATENT DOCUMENTS

| Re. 28,474 | 12/1983 | Anderson et al. | 523/336 |
|---|---|---|---|
| Re. 28,576 | 12/1983 | Anderson et al. | 523/336 |
| 3,284,393 | 11/1966 | Vanderhoff et al. | 260/29.6 |
| 3,288,770 | 11/1966 | Butler | 260/88.3 |
| 3,624,019 | 11/1971 | Anderson et al. | 260/29.6 H |
| 3,734,873 | 5/1973 | Anderson et al. | 260/29.6 H |
| 3,767,629 | 10/1971 | Vallino, Jr. et al. | 260/80.3 N |
| 3,826,771 | 7/1974 | Anderson et al. | 260/29.6 H |
| 3,915,797 | 10/1975 | Ishimatso et al. | 435/180 |
| 3,915,920 | 10/1975 | Slovinsky et al. | 260/29.6 RW |
| 3,920,599 | 11/1975 | Hurlock et al. | 260/29.64 |
| 3,979,348 | 9/1976 | Ballweber et al. | 260/29.4 UA |
| 3,996,180 | 12/1976 | Kane | 260/29.6 H |
| 3,997,492 | 12/1976 | Kane et al. | 260/29.6 WQ |
| 4,001,081 | 1/1977 | Commeyras et al. | 435/840 |
| 4,024,097 | 5/1977 | Slovinsky et al. | 260/29.6 N |
| 4,195,129 | 3/1980 | Fukui et al. | 435/182 |
| 4,276,381 | 6/1981 | Sakimae | 435/179 |
| 4,375,529 | 3/1983 | Fong et al. | 524/555 |
| 4,451,582 | 5/1984 | Denzinger et al. | 435/188 |

FOREIGN PATENT DOCUMENTS

| 0008213 | 8/1979 | European Pat. Off. . |
|---|---|---|
| 53-086078 | 7/1978 | Japan . |

OTHER PUBLICATIONS

Search Report Kirk–Othmer, vol. 5, pp. 735–762.

Primary Examiner—Joseph L. Schofer
Assistant Examiner—Peter D. Mulcahy
Attorney, Agent, or Firm—John G. Premo; Anthony L. Cupoli; Donald G. Epple

[57] ABSTRACT

An improved method for reducing the acrylamide present water-in-oil emulsions of acrylamide polymers with amidase which comprises adding the amidase to the water-in-oil emulsion of the acrylamide polymer upon completion of its polymerization and then subjecting the thus treated water-in-oil emulsion to one or more of the following steps:

(a) pH adjustment
(b) heating
(c) inert gas sparging
(d) adding a chemical reducing agent.

3 Claims, No Drawings

USE OF AMIDASE FOR REDUCING THE ACRYLAMIDE CONTENT OF WATER-IN-OIL EMULSIONS CONTAINING ACRYLAMIDE POLYMERS

INTRODUCTION

When acrylamide is polymerized with itself or with other water-soluble vinyl monomers, water-soluble polymers result. These polymers contain, in addition to starting ingredients or decomposition products thereof, amounts of acrylamide which can be as high as 4000 ppm depending upon the concentration of the polymer and its method of production. An important variable is, of course, the amount of starting acrylamide used to produce the polymer.

An important polymerization technique for producing acrylamide polymers resides in the so-called inverse emulsion polymerization technique which is described in detail in U.S. Pat. No. 3,284,393 and U.S. Pat. No. 28,474. These patents and their disclosures are incorporated herein by reference.

In its broadest aspect, this inverse polymerization process utilizes a water-in-oil emulsion polymerization process in which a water-soluble monomer is emulsified in an oil phase and is polymerized therein. More specifically, in the case of acrylamide polymers, acrylamide or acrylamide with other water-soluble monomers are formed into a water-in-oil emulsion by means of a water-in-oil emulsifing agent. This emulsion also contains a free radical polymerization catalyst capable of forming free radicals. This mixture is then subjected to polymerization conditions as described in the above mentioned patents.

At the end of the polymerization, the polymer may be separated from the emulsion or the emulsion can be treated before, during, or after polymerization with a water-soluble surfactant. When the water-in-oil emulsion containing the water-soluble surfactant is added to water, it rapidly inverts, thus causing rapid dissolution of the polymer. This is described in detail in U.S. Pat. No. 28,474.

THE WATER-IN-OIL EMULSIONS OF WATER-SOLUBLE ACRYLIC ACID POLYMERS

The water-in-oil emulsions of the acrylamide polymers useful in this invention contain four basic components. These components and their weight percentages in the emulsions are listed below:

A. The acrylamide polymer:
  1. Generally from 5–60%;
  2. Preferably from 20–40%; and
  3. Most preferably from 25–35%;
B. Water:
  1. Generally from 20–90%;
  2. Preferably from 20–70%; and
  3. Most preferably from 30–55%;
C. Hydrophobic liquid:
  1. Generally from 5–75%;
  2. Preferably from 5–40%; and
  3. Most preferably from 20–30%; and
D. Water-in-oil emulsifying agent:
  1. Generally from 0.1–20%;
  2. Preferably from 1–15%;
  3. Most preferably from 1.2–10%.

It is also possible to further characterize the water-in-oil emulsions of the acrylamide polymers with respect to the aqueous phase of the emulsions. This aqueous phase is generally defined as the sum of the acrylamide polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

ACRYLAMIDE POLYMERS

The term acrylamide polymer as used herein includes not only homopolymers or acrylamide but also copolymers of acrylamide which contain 5% or more acrylamide units.

CATIONIC ACRYLAMIDE POLYMERS

The acrylmide polymer contained in the water-in-oil emulsions utilized in this invention are polymers and copolymers of cationic or cationically modified acrylamide polymers. Polymers of this type include copolymers of acrylamide and dimethyl amino ethyl methacrylate and its water-soluble quaternary derivatives, poly dimethyl amino ethyl methacrylate and its water soluble quaternary derivatives and polymers and copolymers of diallyl dimethyl ammonium chloride such as that described in U.S. Pat. No. 3,288,770 and further described in water-in-oil emulsion form in U.S. Pat. No. 3,920,599. Other cationically modified polymers suitable for use in the water-in-oil emulsions of this invention include polyacrylamides which have been subjected to the mannich reaction and their corresponding water-soluble quaternary derivatives. Polymers of this type are described in U.S. Pat. No. 3,979,348.

ANIONIC ACRYLAMIDE POLYMERS

Anionic acrylamide polymers include acrylamide polymerized with acrylic acid, 2-acrylamido, 2-methyl propane sulfonic acid, and related suphonate monomers, maleic, fumaric and itaconic acids, styrene sulphonates and the like.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent". Typical specifications of this material are set forth below in Table I.

TABLE I

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having either low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF ACRYLAMIDE POLYMERS

The general method for the preparation of emulsions of the type described above is contained in Vanderhoff, U.S. Pat. No. 3,284,393. A typical procedure for preparing acrylamide polymer emulsions of this type includes preparing an aqueous solution of an acrylamide monomer and adding this solution to one of the hydrocarbon oils described above. With the addition of a suitable water-in-oil emulsifying agent and under agitation, the emulsion is then subjected to free radical polymerization conditions and a water-in-oil emulsion of the the acrylamide polymer is obtained. It should be pointed out that the ingredients are chosen based upon the weight percentages given above and their compatability with each other. As to choice of free radical catalyst, these materials may be either oil or water-soluble and may be from the group consisting of organic peroxides, Vazo type materials, redox type initiator systems, etc.

Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are incorporated by reference. The use of air may be employed to control polymerization. This technique is described in U.S. Pat. No. 3,767, 629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described.

After the polymerization is completed and the emulsion is still in the reactor, it is sometimes the practice, as a final step, to subject the finished emulsion to a so-called post-heat step using temperatures ranging between 45° to 80°'s C. until a satisfactory acrylamide monomer is achieved, generally a period of time ranging between 1-24 hours. This step tends to polymerize a portion of the acrylamide monomer present in the system. It does not effectively reduce the residual acrylamide monomer contents of the system completely. Also at the end of the reaction, it is useful sometimes to sparge the reaction which also tends to retard the deleterious oxidation of certain moities remaining in the system. Also at this point, it is sometimes beneficial to adjust the pH and add a water-soluble surfactant inverting agent. As will be shown later, it is also possible when practicing the techniques of the invention to add a chemical reducing agent.

It is possible to concentrate the emulsions after polymerization is complete by removing the water therefrom. Such a procedure is disclosed in European Pat. Publication No. 0 008 213, the disclosure of which is incorporated herein by reference.

PHYSICAL PROPERTIES OF THE WATER-IN-OIL EMULSIONS

The water-in-oil emulsions of the finely divided acrylamide polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns.

A most preferred particle size is generally within the range of 0.2 to 2.0 microns.

The emulsions prepared having the above compositions generally have a viscosity in the range of from 50 to 200 cps (based on Brookfield viscometer). It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It is important that the emulsion be somewhat fluid, i.e. pumpable.

The emulsions at the end of the polymerization process described above, can contain an initial acrylamide monomer content ranging between 50 to 4000 ppm, although generally the acrylamide monomer content will be within the range of 500–1000 ppm.

Several methods have been proposed for reducing the acrylamide content of these emulsions. One such technique is to hydrogenate to produce propionamide. This is the subject of U.S. Pat. No. 4,375,529. Several chemicals utilizing oxidizing agents have been proposed but they have not met with complete success, either due to efficiency or cost.

Recently in the literature a number of patent documents and literature references have indicated that it is possible to treat acrylamide polymer solutions with the enzyme, Amidase, which selectively reacts with the acrylamide monomer so as to degrade acrylamide to acrylic acid and other less toxic by products. The Amidase does not react with acrylamide polymer.

While Amidase in a semi-purified or purified form has been shown to effectively convert acrylamide monomers present in acrylamide polymer solutions, it has not been suggested in the literature to utilize these enzymes or their precursor bacteria to treat the water-in-oil emulsions of acrylamide polymers of the type described above.

In our earlier experiments using aqueous solutions or suspensions of Amidase, Amidase-containing bacteria or crude Amidase, it was discovered that unless these solutions or suspensions were very carefully added to the acrylamide-containing water-in-oil emulsions, that inversion began to occur which is evidenced by a thickening by the concentrated emulsion which produces a partially inverted emulsion system that is not suitable for commercial use. It was also our experience that when cationic or organic acrylamide emulsions were treated with these enzymes that very little conversion of the acrylamide was achieved. From the above, it is thus evidenced it is not a simple matter to treat acrylamide water-in-oil emulsions with Amidase and achieve satisfactory acrylamide reductions.

THE INVENTION

The invention comprises an improved method for reducing the acrylamide present in water-in-oil emulsions of acrylamide polymers with Amidase which comprises adding the Amidase to the water-in-oil emulsion of the acrylamide polymer upon completion of its polymerization and then subjecting the thus treated water-in-oil emulsion to one or more of the following steps:

(a) pH adjustment,
(b) heating,
(c) inert gas sparging, and,
(d) adding a chemical reducing agent.

The Amidase of this invention is specific to acrylamide monomer and does not appear to affect acrylamide polymer.

THE AMIDASE SPECIES

The Amidase may be derived from a broad spectrum of bacterial species. While it is not possible to list all of the species, illustrative are the:

1. *Brevibacterium ammoniagenes*
2. Mixed culture of Brevibacterium and Bacillus
3. Individual cultures of Bacillus and Pseudomonas
4. Specific Brevibacterium species such as *Brevibacterium acetylicum, Brevibacterium helvolum, Brevibacterium leucinophagum, Brevibacterium linens,* and *Brevibacterium vitarumen.*
5. Rhodococcus species
6. Certain Arthrobacter species
7. *Pseudomonas chloroaphis*

Using known methods of producing enzymes from bacterium cell material, it is possible to produce a crude Amidase from species of the type illustrated above and then to subject such impure Amidase to further purification to produce a substantially pure Amidase.

One method for producing enzymes from bacterium and cell material is disclosed in Japanese Pat. No. 53086078. There, the intracellular enzymes of *Brevibacterium ammoniagenes* was prepared as follows:

The seed strain of the *Brevibacterium ammoniagenes* was cultured at 25°–35° C. at a pH falling within the range of 6.5 to 8.5 in a liquid culture medium containing a carbon source, a nitrogen source, inorganic salts and other nutrients. After cultivation, the bacterial body was separated by filtration and worked up by standard techniques. The crude enzyme was obtained by drying the bacterial body by the acetone powder method or by freeze-drying and breaking the bacterial cells by mashing in buffer solution or by subjection to supersonic waves.

Throughout the specification and claims, we have used the term 'Amidase' which we intend to include pure, and semi-pure Amidase as well as bacterial cells containing Amidase, all of which may be used in the practice of our invention.

Generally, the Amidase will be made up into a solution or suspension, although a powder can be used Amidase prepared from the bacterium cell material is characterized in terms of its activity. The activity varies due to other matter found in the bacterium. Using named techniques, however, activity between 1 and 100 micro moles/minute per mililiter at 30° C. is obtainable. However, activity outside of this range is utilizable and may be obtained using other techniques. Activity for purpose of this application refers to catalytic activity of the Amidase, and is determined by standard methods.

Dosage of Amidase will be characterized in terms of enzyme units, which are defined to be that amount of enzyme which will catalyze the formation of one micro mole of ammonia per minute from a 25 millimolar solution of acrylamide at pH 6.0 and 30° C.

The amount of Amidase used to treat the emulsions will vary depending upon the amount of acrylamide monomer present therein and upon the activity of the Amidase. Assuming an Amidase activity of 50 to 100 units/ml (at 30° C.), a dosage of 10 ml/Kg polymer or less of Amidase will give adequate results in reducing the acrylamide monomer content.

Although more than 1000 units/Kg of Amidase can be utilized for this system, it is not necessary as the Amidase is acting as a catalyst. Although this is true, there is an expected lower dosage limit for the Amidase due to deactivation effects. It is expected that at least 300 units/Kg should be effective. Generally, the Amidase is effective for any concentration of acrylamide monomer. However, for purposes of providing some quantitative guidelines, we feel that generally 50 to 1000 units of Amidase should be utilized per 1000 grams of emulsion. As a general rule, the emulsion will contain 1000 ppm or less of acrylamide monomer. We believe, that this amount of Amidase will be effective with higher amounts of acrylamide monomer and know that it will be effective with lesser concentrations of acrylamide monomer.

After the addition or during the addition of the Amidase, the invention contemplates subjecting the thus treated emulsion to one or more manipulative steps. These steps include pH adjustment, heating, inert gas sparging, and the addition of chemical reducing agents, as described below:

PH ADJUSTMENT

Generally, acrylamide polymer latex has a pH within the range of from 3.5 to 8.5. Normally the pH of most acrylamide polymer latexes should be adjusted so that at the time the Amidase would be added thereto the pH is within the range of 5.0 to 8.5. It is contemplated that to optimize the effects of the Amidase, it would be adjusted so that it is within the range of 6.0 to 7.0. In the case of cationic emulsions, the pH would preferably be adjusted so that it is in the range of 4.5 to 6.0.

We feel constrained to point out that although pH adjustment must sometimes be implemented, that adjustment should be undertaken with caution because of the possibility of problems such as breaking the emulsion.

HEATING THE EMULSION

Conversion of the acrylamide monomer by Amidase can be effected at room temperature, i.e. 25° C. However, a quicker more effective conversion of the acrylamide monomer sometimes occurs at elevated temperatures. Generally, the Amidase treated emulsions are maintained at a temperature ranging between 25° to 60° C. and preferably 40° to 55° C. Higher temperatures than 60° C. Can be used as long as Amidase deactivation by temperature does not become too appreicable.

SPARGING

Improved results may sometimes be achieved if the Amidase treated emulsion is subjected to sparging with nitrogen or other gas that will protect the system from oxidation at a rate of 0.03 to 10.0 cubic feet per minute per gallon of latex treated for the period of time required for Amidase treatment. A sparging technique is described in U.S. Pat. No. 3,767,629.

ADDITION OF CHEMICAL REDUCING AGENTS

Beneficial results are sometimes achieved if the emulsion containing the Amidase is treated with chemical reducing agents. Illustrative of such agents are the following:
glutathione
dithioerythritol
dithiothreitol The dosage of these reducing agents based on the weight of emulsion ranges between 0.5 to 2 ppm, although more preferably 0.5 to 1 ppm.

ADDITION OF THE AMIDASE

When the Amidase is added to the emulsion as a dilute solution or suspension of the type described above, it is necessary that it be done under conditions of good agitation so that the probability of localized conditions of inversion occurring are minimized.

In our copending application, filed of even date herewith, it is shown that it is preferred to add the Amidase which has been previously prepared in the form of a water-in-oil emulsion which emulsion is compatible with the acrylamide containing water-in-oil emulsion. This prevents the partial inversion from happening.

Depending upon the particular treatment employed as described above, the potency of the Amidase, its concentrate, type of the emulsion, it is possible to reduce the acrylamide monomer content of the above described emulsion to less than 10 ppm over a period of time ranging between $\frac{1}{2}$-24 hours. In some systems, longer periods of time may be required.

It has been found that for almost all systems except cationic polymers, that significant reduction of the acrylamide monomer is effectuated. For systems containing cationic polymer, it is believed that significant reduction can be effectuated through concomitant adjustment of pH, heat, and/or inert gas sparging, and/or addition of chemical reducing agents.

As pointed out, the invention is particularly valuable in that by adjusting the pH within the range of 4.5 to 7.0, it is possible to remove the acrylamide monomer which contains quantities of a cationic monomer of the type previously described. To illustrate my invention the following are presented by way of example:

EXAMPLE 1

Within the use of Amidase prepared from Brevibacterium as outlined in discussion above of Japanese Patent 53086078, a typical procedure for Amidase treatment of latex would involve adding sufficient Amidase having sufficient activity to effectuate reduction of initial acrylamide level to less than 10 ppm within the desired time. Although the stirring rate should be selected to provide thorough contact of the Amidase with acrylamide monomers for purposes of this example, the Amidase is added dropwise to 100 grams of a stirred latex. Stirring at a rate of approximately 100 rpm is contemplated and for this example can be effectuated in a common round bottom flask or other suitable vessel. Aliquots of latex should be taken at timed intervals and the emulsion inverted in water to provide 1 to 2% solutions, which should then be immediately analyzed for the acrylamide monomer content at the time interval at which the aliquot was taken.

EXAMPLE 2

Using the procedure of Example 1, 100 grams of a polyacrylamide latex having an RSV of 6–8 and 35% by weight polymer is provided with no pH adjustment. To the latex is added 1.8 grams of Amidase having an activity of 25 units/ml (30° C.) with stirring at a rate sufficient to provide thorough contact of the Amidase with acrylamide monomer. The temperature for the entire system is maintained at 35° C. The initial system contains 1000 ppm acrylamide monomer. At the end of 1 hour, it is contemplated that the system will contain 185 ppm acrylamide monomer; at the end of 5 hours 35 ppm; at the end of 20 hours 8 ppm acrylamide monomer. At approximately 25 hours, acrylamide monomer will be less than 5 ppm.

EXAMPLE 3

Using the procedure of Example 1, 100 grams of a polyacrylamide latex having an RSV of 12–24 and 32 weight percent polymer is provided with no pH adjustment. To the latex is added 1.8 grams of Amidase with stirring at a rate of approximately 100 rpm. The temperature for the entire system initially is 45° C. and it after is maintained at 45° C. The initial system contains 1000 ppm acrylamide monomer. At the end of 1 hour, it is contemplated that the system will contain 75 ppm acrylamide monomer; at the end of 5 hours 35 ppm; at the end of 20 hours 8 ppm acrylamide monomer. At approximately 25 hours, acrylamide monomer will be less than 5 ppm.

EXAMPLE 4

Using the procedure of Example 1, 100 grams of polyacrylamide having an RSV of 18–24 and 32 weight percent polymer is provided with no pH adjustment. To the latex is added 1.0 grams of Amidase with stirring. The systems temperature is maintained at 55° C. Initially 1000 ppm of acrylamide monomer is present. The acrylamide monomer content is reduced to less than 10 ppm at the end of 10 hours.

EXAMPLE 5

The procedure of Example 4 is augmented by sparging with nitrogen gas. Sparging commences immediately prior to addition of the Amidase and continues for 5 hours. At the end of 10 hours, the initial 1000 ppm acrylamide is reduced to less than 5 ppm.

EXAMPLE 6

The procedure of Example 4 is augmented by the addition of 5 ppm glutathione. The glutathione is added to the Amidase. The initial 100 ppm acrylamide monomer content is reduced to less than 5 ppm at the end of 8 hours. Using the procedure of Example 1, 100 grams of an acrylic acid/acrylamide copolymer latex having an RSV of 14 and 40 weight percent polymer is provided with pH adjusted from 8.35 to 6.5. The copolymer includes 30 mole percent acrylic acid and 70 mole percent acrylamide. To the latex is added 1.0 gram of Amidase having an activity of 6 units/ml (30° C.) with stirring. Temperature for the system initially is 60° C. That temperature is maintained for 2 hours after which the system is allowed to cool to 25° C. The initial system content of 800 ppm acrylamide monomer is reduced to 10 ppm at the end of 24 hours.

EXAMPLE 7

Using the procedure of Example 1, 100 grams of diallyl dimethyl ammonium chloride (30%)/ acrylamide (70 mole percent) latex having an RSV of 24 and 25 percent by weight polymer is provided with pH adjustment to 5.5 to the latex is added 1.5 grams of Amidase having an activity of 5 micro moles/min/ml (30° C.) with stirring. The temperature for the system is maintained at 50° C. The initial acrylamide content of 700 ppm is reduced to 200 ppm at the end of 18 hours. At the end of 48 hours the acrylamide monomer content is reduced to 80 ppm.

EXAMPLE 8

Using the method of Example 1, 100 grams of dimethyl amine ethyl methacrylate, methyl chloride quat. (45 weight %)/acrylamide (55 weight %) copolymer latex having an RSV of 14 and 40% by weight polymer is provided with pH adjustment to 5.5. To the latex is added 1.0 grams of Amidase having activity of 5 micro moles/min/ml (30° C.) with stirring. The temperature for the system is continously maintained at 45° C. The initial acrylamide monomer content of 900 ppm is reduced to 200 ppm at the end of 24 hours. At the end of 48 hours, the acrylamide monomer content is reduced to 150 ppm.

EXAMPLE 9

Using the method of Example 1, 100 grams of dimethyl amino ethyl methacrylate, methyl chloride quat. (45 weight %)/acrylamide (55 weight %) copolymer latex having an RSV of 14 and 40% by weight polymer is provided with pH adjustment to 3.8. To the latex is added 1.0 grams of Amidase having an activity of 5 micro moles/min/ml (30° C.) with stirring. The temperature for the system is continously maintained at 45° C. The initial acrylamide monomer content of 900 ppm is reduced to 400 ppm at the end of 24 hours. At the end of 48 hours, the acrylamide monomer is reduced to 380 ppm.

EXAMPLE 10

Using the procedure of Example 1, 100 grams of diallyl dimethyl ammonium chloride ( 10 mole %)/ acrylic acid ( 40 mole %)/acrylamide (50 mole %) (35% activity) is provided. To the latex is added 1.8 grams of Amidase with stirring at a rate of approximately 100 rpm. The temperature for the entire system initially is 35° C. and it after is maintained at 35° C. The initial system contains 100 ppm acrylamide monomer. At the end of 1 hour, it is contemplated that the system will contain 85 ppm acrylamide monomer; at the end of 5 hours 35 ppm; at the end of 20 hours 8 ppm acrylamide monomer. At approximately 25 hours, acrylamide monomer will be less than 5 ppm.

EXAMPLE 11

Using the procedure of Example 1, 100 grams of an acrylic acid (60 mole %)/ acrylamide (40 mole %) copolymer latex having an RSV of 20 and 28 weight % polymer is provided with a pH adjusted to 6.5. To the latex is added 2.0 grams of Amidase with stirring. The temperature for the entire system is maintained at 45° C. The initial system contains 1000 ppm acrylamide monomer. At the end of 10 hours, the acrylamide monomer content is less than 10 ppm.

EXAMPLE 12

Using the procedure of Example 1, 100 grams of an acrylic acid (60 mole %)/ acrylamide (40 mole %) copolymer latex having an RSV of 40 and 28 weight % polymer is provided with a pH adjusted to 8.5. To the latex is added 2.0 grams of Amidase with stirring. The temperature for the entire system is maintained at 45° C. The initial system contains 1000 ppm acrylamide monomer. At the end of 24 hours, the acrylamide monomer content is less than 400 ppm.

Having thus described our invention, we claim:
1. An improved method for reducing the acrylamide present in water-in-oil emulsions of acrylamide poly- mers with Amidase which comprises adding the Amidase to the water-in-oil emulsion of the acrylamide polymer upon completion of its polymerization and then subjecting the thus treated water-in-oil emulsion to one or more of the following steps:
  (a) pH adjustment,
  (b) heating,
  (c) inert gas sparging, and,
  (d) adding a chemical reducing agent.

2. The improved method of claim 1 where the acryamide polymer is a cationic acrylamide polymer and the pH is adjusted within the range of 4.8 to 8.0.

3. The improved method of claim 1 wherein the acrylamide polymer is an anionic acrylamide polymer and the pH is adjusted within the range of 6.5 to 8.5.

* * * * *